(12) United States Patent
Larson et al.

(10) Patent No.: US 12,234,031 B2
(45) Date of Patent: Feb. 25, 2025

(54) CARGO RESTRAINT SYSTEM WITH INDIVIDUALLY RETRACTABLE RESTRAINTS

(71) Applicant: GOODRICH CORPORATION, Charlotte, NC (US)

(72) Inventors: Wallace Harold Larson, Jamestown, ND (US); Brandon David Lee, Jamestown, ND (US); Zachary Meyer, Jamestown, ND (US); Jacob Hatfield, Grand Forks, ND (US); Alexander Mitchell Heyd, Jamestown, ND (US); Lynne Almvig, Mt. Vernon, WA (US)

(73) Assignee: GOODRICH CORPORATION, Charlotte, NC (US)

( * ) Notice: Subject to any disclaimer, the term of this patent is extended or adjusted under 35 U.S.C. 154(b) by 799 days.

(21) Appl. No.: 17/397,813

(22) Filed: Aug. 9, 2021

(65) Prior Publication Data
US 2023/0045185 A1    Feb. 9, 2023

(51) Int. Cl.
*B64D 9/00* (2006.01)
*B60P 7/08* (2006.01)
*B60P 7/13* (2006.01)

(52) U.S. Cl.
CPC ............ *B64D 9/003* (2013.01); *B60P 7/0807* (2013.01); *B60P 7/0892* (2013.01); *B60P 7/13* (2013.01); *B64D 2009/006* (2013.01)

(58) Field of Classification Search
CPC ......... B60P 7/0807; B60P 7/0892; B60P 7/10; B60P 7/13; B60P 7/18; B60P 1/649; B64D 9/003

USPC .......................................... 410/69, 77–80, 94
See application file for complete search history.

(56) References Cited

U.S. PATENT DOCUMENTS

| | | |
|---|---|---|
| 3,377,040 A | 4/1968 | Hansen |
| 3,693,919 A | 9/1972 | Albert et al. |
| 3,759,476 A | 9/1973 | Goodwin |
| 3,986,460 A | 10/1976 | Voigt et al. |
| 4,049,286 A | 9/1977 | Francis, Jr. |
| 4,077,590 A | 3/1978 | Shorey |
| 4,331,412 A | 5/1982 | Graf |

(Continued)

FOREIGN PATENT DOCUMENTS

| | | |
|---|---|---|
| AU | 6712381 | 8/1981 |
| DE | 102010035099 | 2/2012 |

(Continued)

OTHER PUBLICATIONS

European Patent Office, European Search Report dated Apr. 29, 2019 in Application No. 19150916.5.

(Continued)

*Primary Examiner* — Stephen T Gordon
(74) *Attorney, Agent, or Firm* — SNELL & WILMER L.L.P.

(57) ABSTRACT

A cargo restraint system may comprise a restraint and an actuator shaft configured to rotate the restraint between a raised position and a stowed position. The restraint may include a head configured to rotate about an axis and a plunger configured to translate between an engaged state and a disengaged state. When the plunger is in the engaged state, the head is rotationally coupled to the actuator shaft. When the plunger is in the disengaged state, the head can rotate independently of the actuator shaft.

20 Claims, 15 Drawing Sheets

(56) References Cited

U.S. PATENT DOCUMENTS

| | | | |
|---|---|---|---|
| 4,349,302 | A | 9/1982 | Ferguson, Jr. |
| 4,375,932 | A | 3/1983 | Albert |
| 4,395,172 | A | 7/1983 | Hoener et al. |
| 4,457,649 | A | 7/1984 | Vogg et al. |
| 4,461,437 | A | 7/1984 | Ashley et al. |
| 4,867,622 | A | 9/1989 | Brown |
| 5,000,635 | A | 3/1991 | Jensen et al. |
| 5,131,606 | A | 7/1992 | Nordstrom |
| 5,316,242 | A | 5/1994 | Eilenstein-Wiegmann et al. |
| 5,957,406 | A | 9/1999 | Nelson |
| 6,051,133 | A | 4/2000 | Huber |
| 6,270,300 | B1 | 8/2001 | Huber |
| 6,413,029 | B1 | 7/2002 | Kernkamp |
| 6,425,717 | B1 | 7/2002 | Saggio |
| 6,485,238 | B2 | 11/2002 | Segura |
| 6,557,800 | B2 | 5/2003 | Medina |
| 6,729,818 | B1 | 5/2004 | Yee et al. |
| 6,926,481 | B2 | 8/2005 | Huber |
| 7,086,517 | B2 | 8/2006 | Clos |
| 7,344,013 | B2 | 3/2008 | Krueger |
| 7,731,460 | B2 | 6/2010 | Brown |
| 8,066,458 | B2 | 11/2011 | Schulze et al. |
| 8,066,459 | B2 | 11/2011 | Schulze et al. |
| 8,118,524 | B2 | 2/2012 | Schulze et al. |
| 8,256,602 | B2 | 9/2012 | Huber et al. |
| 8,585,334 | B2 | 11/2013 | Moradians |
| 8,821,088 | B2 | 9/2014 | Roberts |
| 8,926,243 | B2 | 1/2015 | Schulze |
| 8,936,419 | B1 | 1/2015 | Islam |
| 9,242,730 | B2 | 1/2016 | Larson et al. |
| 9,447,618 | B2 | 9/2016 | Albers et al. |
| 9,932,113 | B1 | 4/2018 | Larson |
| 10,017,251 | B2 * | 7/2018 | Rowles .................. B60P 7/08 |
| 10,106,239 | B2 | 10/2018 | Woodland |
| 10,118,700 | B2 | 11/2018 | Kuppan |
| 10,293,939 | B2 | 5/2019 | Conejero Moreno |
| 11,072,425 | B2 | 7/2021 | Shivalinga et al. |
| 2004/0265085 | A1 | 12/2004 | Mayer |
| 2007/0086870 | A1 | 4/2007 | Schulze |
| 2007/0086871 | A1 * | 4/2007 | Brekken ................ B64D 9/003 410/77 |
| 2007/0237598 | A1 | 10/2007 | Schulze |
| 2007/0253790 | A1 | 11/2007 | Boggenstall |
| 2008/0310944 | A1 | 12/2008 | Stegmiller |
| 2010/0143063 | A1 | 6/2010 | Dugic |
| 2010/0196116 | A1 * | 8/2010 | Hudson ................. B64D 9/003 410/77 |
| 2011/0150594 | A1 | 6/2011 | Schulze |
| 2012/0037753 | A1 | 2/2012 | Huber et al. |
| 2013/0334367 | A1 | 12/2013 | Larson |
| 2016/0001870 | A1 | 1/2016 | Moradians et al. |
| 2016/0194082 | A1 | 7/2016 | Himmelmann |
| 2017/0197717 | A1 | 7/2017 | Trisotto |
| 2018/0222586 | A1 | 8/2018 | Shivalinga |
| 2018/0273177 | A1 | 9/2018 | Jayaprakash |
| 2019/0061945 | A1 | 2/2019 | Quixano Mendez |
| 2019/0210728 | A1 | 7/2019 | Pfau et al. |
| 2021/0214083 | A1 | 7/2021 | Larson et al. |

FOREIGN PATENT DOCUMENTS

| | | |
|---|---|---|
| EP | 0881144 | 12/1998 |
| EP | 3508422 | 7/2019 |
| FR | 2918640 | 1/2009 |
| FR | 2918641 | 1/2009 |
| GB | 2436715 | 10/2007 |
| WO | 2004054876 | 7/2004 |

OTHER PUBLICATIONS

USPTO, Non-Final Office Action dated Jun. 27, 2019 in U.S. Appl. No. 15/866,241.

USPTO, Notice of Allowance dated Dec. 17, 2019 in U.S. Appl. No. 15/866,241.

European Patent Office, European Search Report dated Jun. 26, 2020 in Application No. 19213585.3.

European Patent Office, European Search Report dated Jul. 10, 2020 in Application No. 19214487.1.

European Patent Office, European Search Report dated Jul. 21, 2020 in Application No. 19216272.5.

USPTO, Pre-Interview First Office Action dated Sep. 30, 2020 in U.S. Appl. No. 16/539,203.

USPTO, Pre-Interview First Office Action dated Sep. 30, 2020 in U.S. Appl. No. 16/539,224.

USPTO, Notice of Allowance dated Nov. 20, 2020 in U.S. Appl. No. 16/539,203.

USPTO, Notice of Allowance dated Nov. 23, 2020 in U.S. Appl. No. 16/539,224.

USPTO, Restriction/Election Requirement dated May 17, 2021 in U.S. Appl. No. 16/539,782.

USPTO, Non-Final Office Action dated Oct. 1, 2021 in U.S. Appl. No. 16/539,782.

USPTO; Non-Final Office Action dated Sep. 25, 2024 in U.S. Appl. No. 17/528,065.

European Patent Office, European Office Action dated Aug. 8, 2022 in Application No. 19213585.3.

European Patent Office, European Search Report dated Dec. 14, 2022 in Application No. 22186546.2.

European Patent Office, European Office Action dated Mar. 17, 2022 in Application No. 19214487.1.

USPTO, Notice of Allowance dated Feb. 7, 2022 in U.S. Appl. No. 16/539,782.

USPTO, Supplemental Notice of Allowance dated Feb. 24, 2022 in U.S. Appl. No. 16/539,782.

European Patent Office, European Partial Search Report dated Mar. 20, 2023 in Application No. 22206500.5.

European Patent Office, European Partial Search Report dated Jun. 21, 2023 in Application No. 22206500.5.

European Patent Office, European Office Action dated Sep. 27, 2023 in Application No. 19213585.3.

* cited by examiner

CARGO RESTRAINT SYSTEM WITH INDIVIDUALLY RETRACTABLE RESTRAINTS

FIELD

The present disclosure is directed to cargo restraint systems and, more particularly, to a cargo restraint system capable of actuating restraints in groups and individually.

BACKGROUND

Many aircraft have at least one cargo bay designed to receive cargo. Such cargo bays include cargo loading systems that include rollers located on a floor of the cargo bay to provide conveyance for moving a unit load device (ULD) or other cargo through the cargo bay. After cargo has been loaded into the cargo bay, it may be desirable to restrain the cargo. Some ULDs have pockets along the sides of the ULD. Restraints may be located in the pockets to provide longitudinal and/or lateral restraint. Such restraint reduces the likelihood of cargo shifting relative to the cargo bay during taxi, takeoff, flight, and landing. Some current restraint actuation systems gang (or group) together multiple restraints such that restraints can be actuated (e.g., raised or stowed) from a single point and/or with a single action. Raising or stowing all of the ganged restraints limit the number of available cargo load configurations. In this regard, additional cargo load configurations would be possible if individual restraints, within the ganged restraints, could be selectively rotated to a stowed position.

SUMMARY

A restraint for use with a cargo loading system is disclosed herein. In accordance with various embodiments, the restraint may comprise a head defining a plunger channel and a plunger including a plunger rod and a plunger lever. The plunger rod may be located, at least, partially in the plunger channel. A plunger torsion spring may be configured to apply a first biasing load to the plunger lever. A compression spring may be configured to bias a first end of the plunger away from an upper surface of the head.

In various embodiments, a drive cap may be located around the first end of the plunger rod. In various embodiments, a shroud may be located proximate the first end of the plunger rod. The shroud may define a plunger opening configured to receive the first end of the plunger rod.

In various embodiments, the shroud may include a protrusion extending radially outward from an outer circumferential surface of the shroud. In various embodiments, the protrusion may be configured to contact the drive cap.

In various embodiments, the head may include a first lever interference surface configured to contact a first lever surface of the plunger lever, when the first end of the plunger rod is located in the plunger opening of the shroud. In various embodiments, an end of the plunger lever may be configured to rotate above the upper surface of the head in response to the first end of the plunger rod being located radially outward of an outer circumferential surface of the shroud.

A cargo restraint system is also disclosed herein. In accordance with various embodiments, the cargo restraint system may comprise a first restraint configured to rotate about an axis, a second restraint configured to rotate about the axis, and an actuator assembly configured to simultaneously rotate the first restraint and the second restraint between a raised position and a stowed position. The first restraint may include a head configured to rotate about the axis, and a plunger configured to translate between an engaged state and a disengaged state. In the engaged state the head may be rotationally coupled to the actuator assembly, and in the disengaged state the head of the first restraint may rotate independently of the second restraint and the actuator assembly.

In various embodiments, the plunger may include a plunger rod and a plunger lever. The plunger rod may be configured to translate in a radial direction relative to the axis. The plunger lever may be configured to rotate about a pin located through the plunger rod.

In various embodiments, the first restraint may further include a plunger torsion spring configured to apply a first biasing load to the plunger lever, and a compression spring configured to bias a first end of the plunger rod toward the axis. In various embodiments, the head of the first restraint may include a first lever interference surface configured to contact a first lever surface of the plunger when the plunger is in the engaged state.

In various embodiments, the actuator assembly may comprise an actuator shaft configured to rotate about the axis. The first restraint and the second restraint may be located about the actuator shaft.

In various embodiments, the first restraint may further include a shroud located radially between the actuator shaft and the head of the first restraint. The shroud may define a plunger opening configured to receive the plunger. In the engaged state, the plunger is located in the plunger opening. In the disengaged state, the plunger is located radially outward of an outer circumferential surface of the shroud.

In various embodiments, the first restraint may further include a drive cap coupled to the head. The shroud may include a protrusion extending radially outward from the outer circumferential surface of the shroud. The protrusion may be configured to contact the drive cap. In various embodiments, a key may be located in a key opening defined by the shroud and in a key channel defined by the actuator shaft.

A cargo loading system is also disclosed herein. In accordance with various embodiments, the cargo loading system may comprise a panel defining an orifice, a restraint located in the orifice, and an actuator shaft configured to rotate the restraint between a raised position and a stowed position. The restraint may comprise a head configured to rotate about an axis and a plunger configured to translate between an engaged state and a disengaged state. In the engaged state, the head is rotationally coupled to the actuator shaft. In the disengaged state, the head may rotate independently of the actuator shaft.

In various embodiments, the plunger may include a plunger rod and a plunger lever. The restraint may further include a plunger torsion spring configured to apply a biasing load to the plunger lever and a compression spring configured to bias a first end of the plunger rod away from an upper surface of the head.

In various embodiments, in the disengaged state, the plunger lever may be configured to contact an underside surface of the panel when the restraint is in the stowed position.

In various embodiments, the restraint may further include a shroud located radially between the actuator shaft and the head of the first restraint. The shroud may define a plunger opening configured to receive the plunger. In the engaged state, the plunger may be located in the plunger opening, and in the disengaged state, the plunger may be located radially outward of an outer circumferential surface of the shroud.

In various embodiments, the restraint may further include a drive cap coupled to the head. The shroud may include a protrusion extending radially outward from the outer circumferential surface of the shroud. The protrusion may be configured to contact the drive cap.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure provides a restraint for an aircraft cargo restraint system that is individually retractable. In this regard, the restraint may be rotated (e.g., using any appropriate motion or combination of motions) from a raised (or deployed) position to a stowed position, while the other restraints in the system remain in the raised position. In accordance with various embodiments, the restraint system includes an actuation assembly configured to translate and/or rotate a first group of the restraints. Each of the restraints in the first group of restraints includes a plunger. The plunger may be translated between an engaged state and a disengaged state. When a restraint's plunger is in the engaged state, the restraint is rotationally coupled to its respective actuation assembly, such that rotation of the actuation assembly causes rotation of the restraint. When a restraint's plunger is in the disengaged state, the restraint may be actuated (e.g., rotated) independently from the other restraints coupled to the actuation assembly. Allowing the restraints to be actuated as a group or independently from one another allows for both control of groups from a single actuation, while increasing the number of available restraining configurations throughout the cargo deck.

Figure 1:
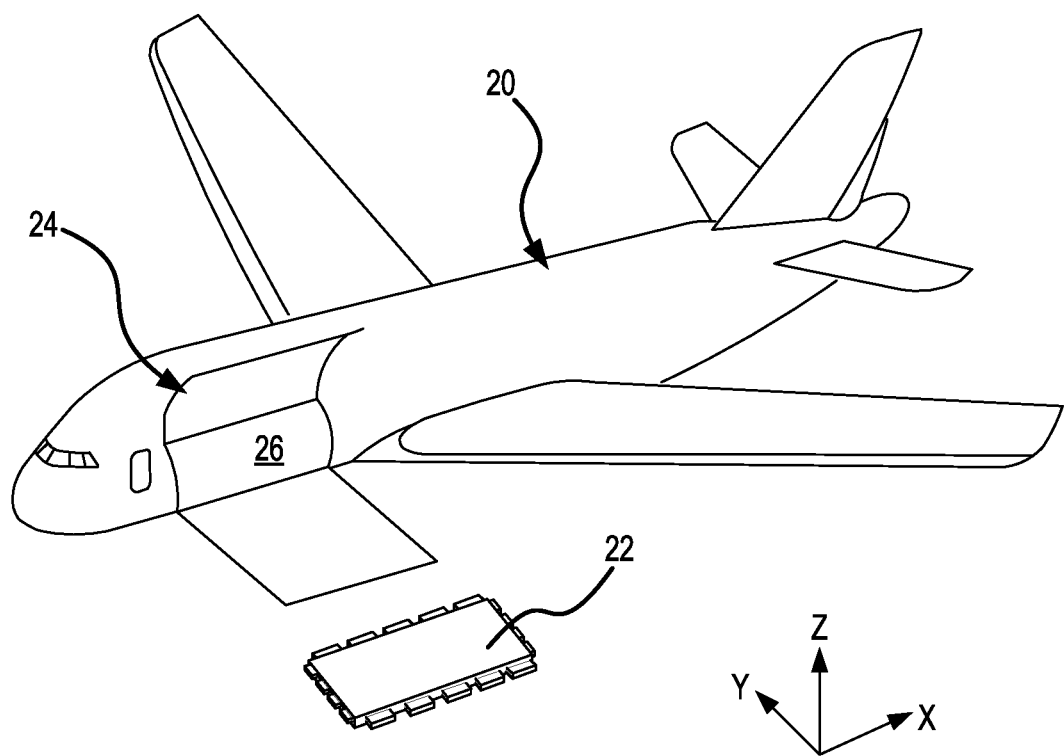
FIG. 1 illustrates an aircraft being loaded with cargo, in accordance with various embodiments.
Figure 2:
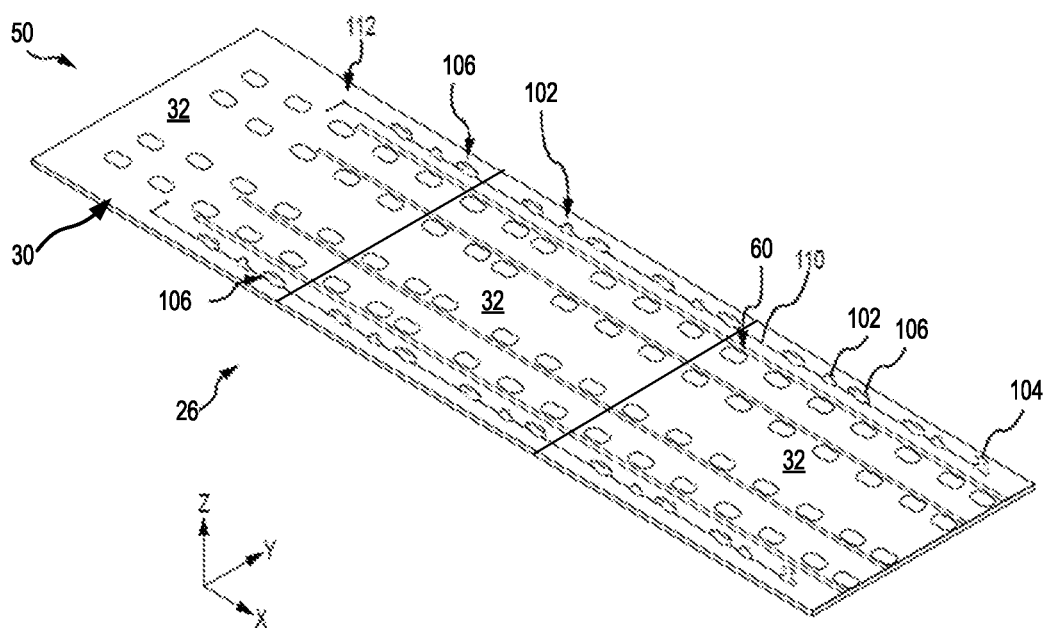
FIG. 2 illustrates a portion of an aircraft cargo deck having a cargo restraint system, in accordance with various embodiments.

FIG. 1 illustrates an aircraft 20 with cargo 22 being loadable through a loading door 24 of the aircraft 20. Cargo 22 (e.g., a ULD, pallet, or the like) may be loaded through loading door 24 and onto a cargo deck 26. FIG. 2 illustrates cargo deck 26. An X-Y-Z axis is shown in various drawings to illustrate various orientations of components. With reference to FIG. 2, cargo deck 26 includes a cargo deck floor 30, which may be formed by one or more panels 32 that are coupled to various structural components of aircraft 20 (e.g., to beams, floors, etc.).

With continued reference to FIG. 2, in accordance with various embodiments, cargo deck 26 includes a cargo restraint system 50. Stated differently, cargo restraint system 50 may be installed along cargo deck 26. Cargo deck 26 may also include a cargo loading system 60 comprising a plurality of freely rotating conveyance rollers and/or powder drive units (PDUs) mounted in the cargo deck 26 to define the conveyance plane. Cargo loaded onto the aircraft cargo deck 26 can be moved throughout the cargo deck 26 using the cargo loading system 60.

Cargo restraint system 50 may be used to restrain cargo (e.g., unit load devices (ULDs)) within/relative to the cargo deck 26. The cargo restraint system 50 may include a plurality of first restraints 102, one or more secondary restraints 104, and a plurality of third restraints 106. In various embodiments, the first restraints 102 may be referred to as X-restraints as they may restrict cargo from translating in the X (or longitudinal) direction. The secondary restraints 104 may be referred to as Z-restraints as they may restrict cargo from translating in the Z (or vertical) direction. The third restraints 106 may be referred to as YZ-restraints as they may restrict translation of cargo in the Z direction and the Y (or lateral) direction. However, one skilled in the art will realize that the restraints 102, 104, 106 may be used to restrain cargo in any other directions (e.g., the first restraints 102 may restrain cargo in the Y direction, secondary restraints may restrain cargo in the X direction, etc.).

The restraint system 50 may include an actuation assembly 110. A control region 112 of actuation assembly 110 may be located, for example, proximate loading door 24, a forward end of the aircraft, and/or at any other location that may be readily accessible to crew responsible for loading cargo into cargo deck 26. As described in further detail below, various components of actuation assembly 110 may be located under panels 32. Actuation assembly 110 is configured to control the actuation of the first restraints 102. In this regard, actuation assembly 110 may be employed to simultaneously rotate first restraints 102 between a raised position and a stowed position. In various embodiments, actuation assembly 110 may also control actuation of the second restraints 104 and/or the third restraints 106.

Figure 3:
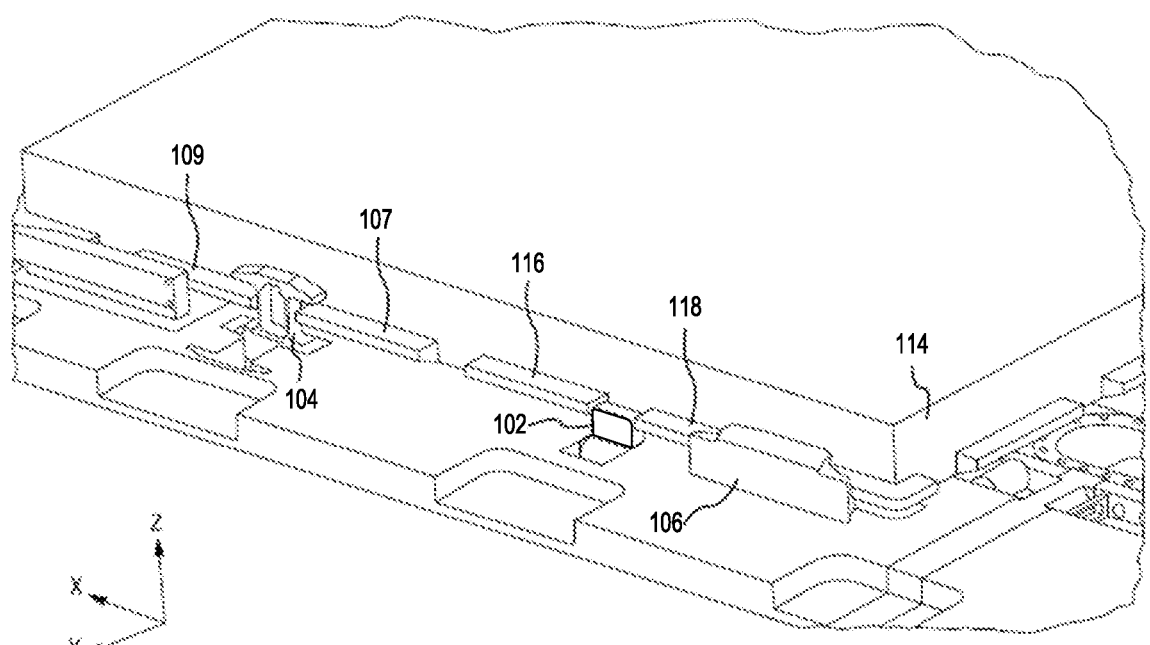
FIG. 3 illustrates a portion of the cargo restraint system of FIG. 2, in accordance with various embodiments.

FIG. 3 illustrates how the various restraints of restraint system 50 may restrain a ULD 114. As shown, the first restraint 102 may rest between tab 116 and tab 118 of the ULD 114, restricting movement of the ULD 114 in the X direction. The second restraint 104 may rest above and between tab 107 and tab 109 of the ULD 114, restricting movement of the ULD 114 in the Z direction and the X direction. The third restraint 106 may rest adjacent and above the tab 118 of the ULD 114, restricting movement of the ULD 114 in the Y direction and the Z direction.

Figure 4A:
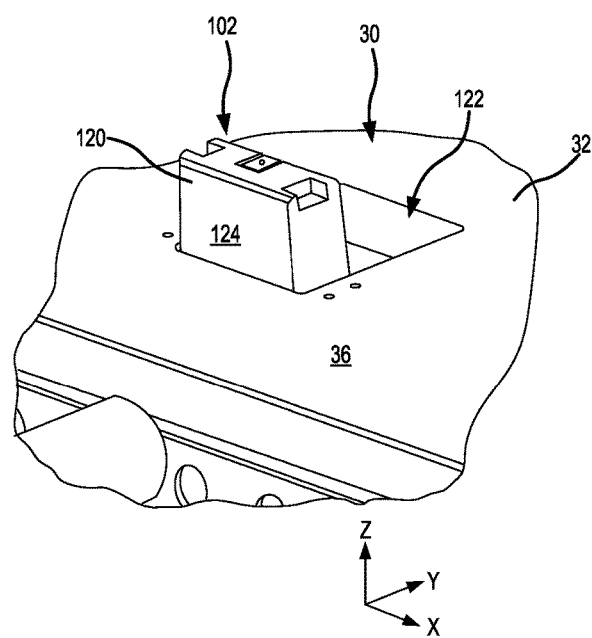
FIGS. 4A and 4B illustrate a first restraint of the cargo restraint system of FIG. 2 in a raised position and a stowed position, respectively, in accordance with various embodiments.
Figure 4B:
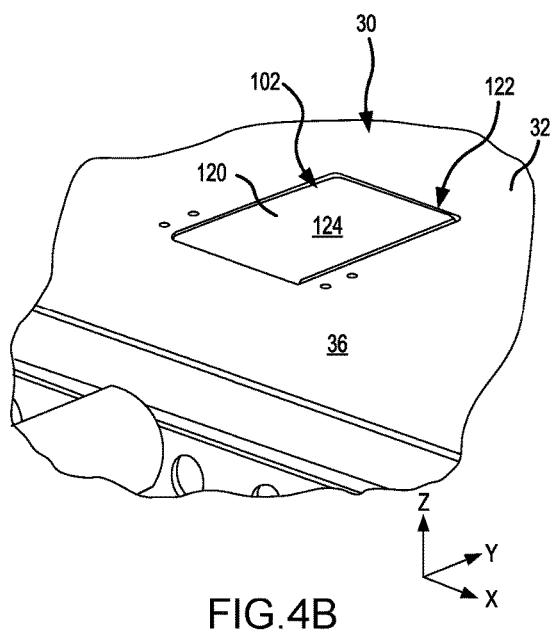

Referring now to FIG. 4A and FIG. 4B, additional details of a first restraint 102 are shown. As shown, first restraint 102 may be actuated between a raised position (as shown in FIG. 4A) and a stowed position (as shown in FIG. 4B). First restraint 102 may include a head (or restraint body) 120, which may be both raised and stowed. In the raised position, head 120 extends above the cargo deck floor 30. Stated differently, in the raised position, at least, a portion of head 120 is located above an upper surface 36 of the panel 32. In the stowed position, head 120 may fit within an orifice 122 formed in the cargo deck floor 30. For example, panel 32 may define an orifice 122 configured to receive head 120. In the stowed position, a first surface 124 of head 120 may be substantially flush (e.g., ±15° from flush) and/or planar with upper surface 36 of the panel 32.

Figure 5A:
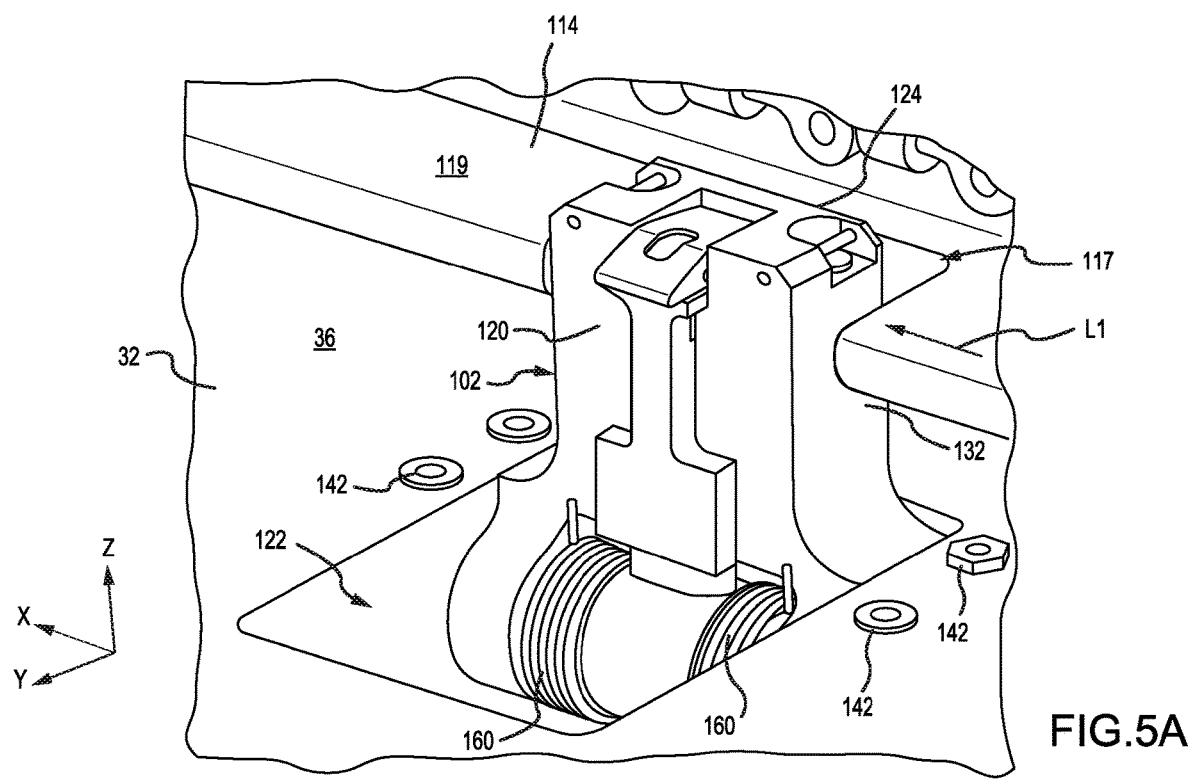
FIGS. 5A and 5B illustrate the first restraint of the cargo restraint system of FIG. 2 in the raised position, in accordance with various embodiments.
Figure 5B:
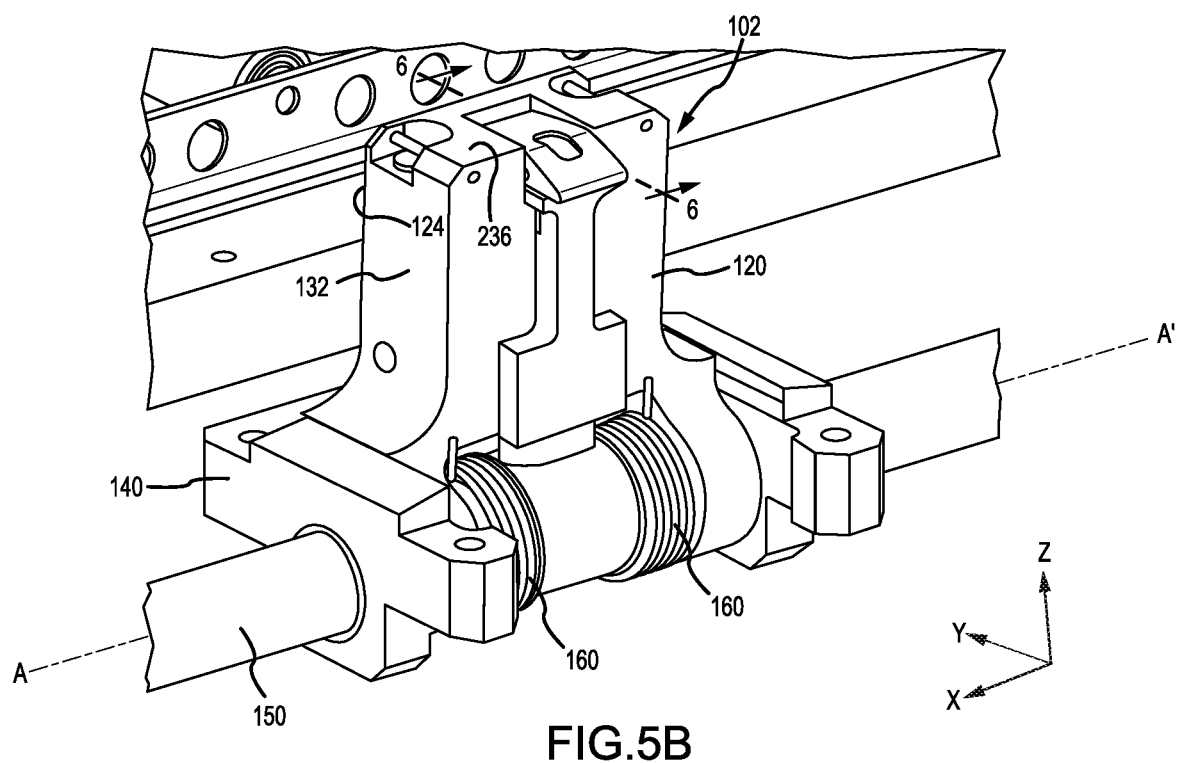

With reference to FIG. 5A and FIG. 5B, first restraint 102 is illustrated in the raised position. In FIG. 5B, panel 32 is removed to illustrate components of cargo restraint system 50 that may be located under upper surface 36 of panel 32. First restraint 102 may be raised into (e.g., located within) a pocket 117 of ULD 114. Pocket 117 may be defined by a flange 119 located about a perimeter of ULD 114. Flange 119 may form one or more of tabs 107, 109, 116, 118 in FIG. 3. A mount 140 (FIG. 5B) may be coupled to panel 32 via fasteners 142. In accordance with various embodiments, an actuator shaft 150 may be located through, and may extend through, mount 140 and head 120. Stated differently, mount 140 and head 120 may be located on, and/or mounted on, actuator shaft 150. Mount 140 may be a stationary structure. Head 120 and actuator shaft 150 may rotate relative to mount 140. Actuator shaft 150 rotates about an axis A-A'.

In various embodiments, first restraint 102 may include one or more head torsion spring(s) 160. In various embodiments, head torsion spring 160 may be configured to bias head 120 toward the raised position. Stated differently, head torsion spring 160 may be configured to bias head 120 in a first circumferential direction C1 (FIG. 6) about axis A-A'. In various embodiments, head torsion spring 160 may be configured to bias head 120 toward the stowed position. In various embodiments, the head torsion spring may be eliminated. As described in further detail below, first restraint 102 includes a plunger 170 (FIG. 6), which may engage actuator shaft 150, such that rotation of actuation shaft is transferred to head 120. Stated differently, when the plunger 170 is in an engaged state, head 120 rotates with actuator shaft 150.

Figure 6:
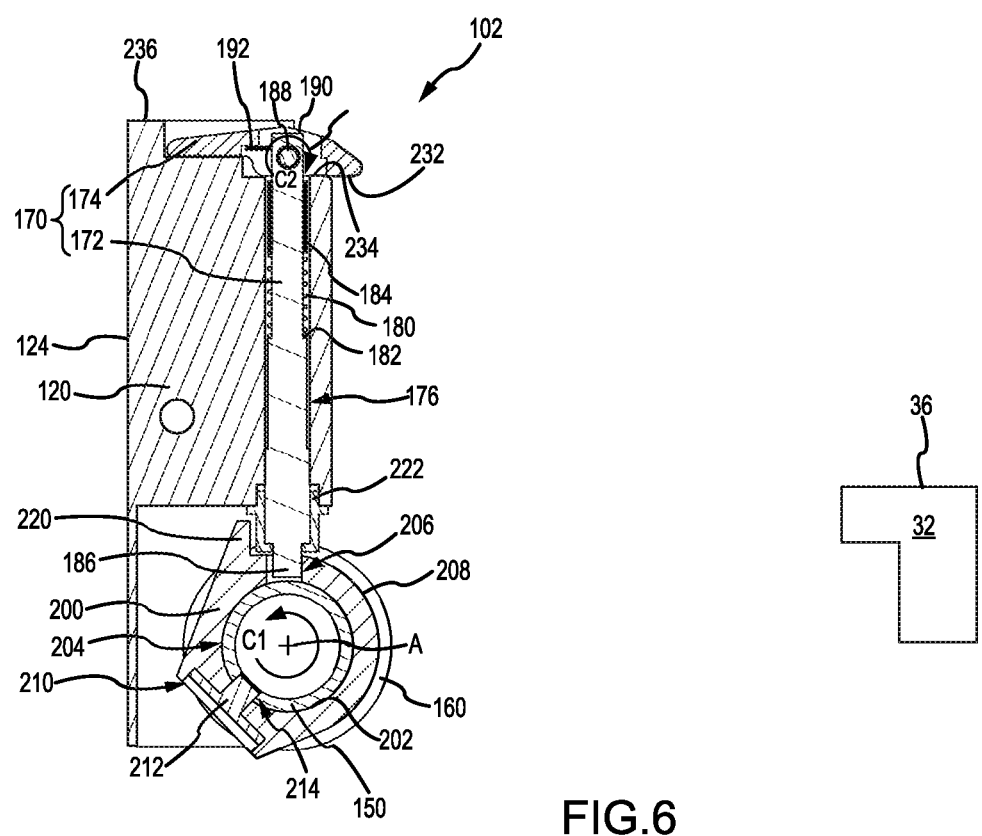
FIG. 6 illustrates a cross-section view of the first restraint of the cargo restraint system of FIG. 2 in the raised position, with the cross-section taken along the line 6-6 in FIG. 5B.

With reference to FIG. 6, a cross-section view of first restraint 102, taken along line 6-6 in FIG. 5B, is illustrated. In accordance with various embodiments, first restraint 102 includes a plunger 170. In FIG. 6, first restraint 102 is in the raised position and plunger 170 is in an engaged state. Plunger 170 includes a plunger rod 172 and a plunger lever 174. Plunger rod 172 is configured to translate radially (i.e., perpendicular to axis A-A'). In this regard, plunger rod 172 translates toward and away from actuator shaft 150 and axis A-A'. In various embodiments, plunger rod 172 may be located in a plunger channel 176 defined by head 120. A compression spring 180 may be located about plunger rod 172. Compression spring 180 may be compressed between a spring interference surface 182 of plunger rod 172 and a bushing 184 located about plunger rod 172. In various embodiments, bushing 184 may be eliminated and compression spring 180 may be compressed between spring interference surface 182 of plunger rod 172 and a second spring interference surface formed by head 120. Compression spring 180 biases a first end 186 of plunger rod 172 in the radially inward direction (i.e., toward actuator shaft 150 and axis A-A').

A pin 188 may be located through plunger rod 172 and plunger lever 174. Pin 188 may be located proximate a second end 190 of plunger rod 172. Second end 190 is opposite first end 186. Plunger lever 174 may rotate about pin 188. A plunger torsion spring 192 may be located about pin 188 and may apply a biasing load to plunger lever 174. Plunger torsion spring 192 may bias plunger lever 174 in a first circumferential direction C2 about pin 188.

In accordance with various embodiments, a shroud 200 may be located about actuator shaft 150. Stated differently, an inner circumferential surface 202 of shroud 200 may define a shaft channel 204 configured to receive actuator shaft 150. In accordance with various embodiments, a plunger opening 206 is formed in the outer circumferential surface 208 of shroud 200. Stated differently, shroud 200 defines plunger opening 206. Plunger opening 206 is configured to receive first end 186 of plunger rod 172. Locating plunger rod 172 in plunger opening 206 creates an interference between plunger rod 172 and shroud 200, such that plunger rod 172 is prevented from translating relative to shroud 200. In accordance with various embodiments, shroud 200 defines a key opening (e.g., a bore) 210 configured to receive a key 212. Actuator shaft 150 may define a key channel 214. Key 212 may be located through key opening 210 and in key channel 214, in response to radially aligning key opening 210 and key channel 214. Locating key 212 in key opening 210 and key channel 214 rotationally couples shroud 200 to actuator shaft 150, such that rotation of actuator shaft 150 about axis A-A' causes shroud 200 to rotate about axis A-A'.

Shroud 200 includes a protrusion 220. Protrusion 220 extends radially outward from outer circumferential surface 208 of shroud 200. A drive cap 222 may be located around first end 186 of plunger rod 172, and between plunger rod 172 and head 120. Drive cap 222 may be coupled to head 120. When plunger 170 is an engaged state (i.e., when plunger rod 172 is located in plunger opening 206), protrusion 220 may be located proximate drive cap 222 and/or may abut drive cap 222.

Rotation of actuator shaft 150 about axis A-A' causes shroud 200 to rotate in the same direction about axis A-A' as actuator shaft 150 due to key 212 being located in and contacting both actuator shaft 150 and shroud 200. When plunger 170 is in the engaged state, rotation of shroud 200 in a second circumferential direction C4 (FIG. 7A) causes head 120 to rotate in the second circumferential direction C4 about axis A-A' due to the contact between protrusion 220 and drive cap 222. When plunger 170 is in the engaged state, rotation of shroud 200 in first circumferential direction C1 causes head 120 to rotate in the first circumferential direction C1 about axis A-A' due to the contact between shroud 200 and first end 186 of plunger rod 172. In this regard, when plunger 170 is in the engaged state, rotational force in the second circumferential direction C4 (FIG. 7A) is transferred from shroud 200 to head 120 via contact between protrusion 220 and drive cap 222, and rotational force in the first circumferential direction C1 is transferred from shroud 200 to head 120 via contact between first end 186 of plunger rod 172 and the surface defining shroud opening 206.

When plunger rod 172 is radially aligned with plunger opening 206, compression spring 180 forces first end 186 of plunger rod 172 into plunger opening 206 (i.e., plunger 170 is forced into the engaged state). When plunger rod 172 is located in plunger opening 206, the location of second end 190 of plunger rod 172 and pin 188 generates an interference between a first lever surface 232 of plunger lever 174 and a first lever interference surface 234 of head 120. In accordance with various embodiments, plunger torsion spring 192 is configured to bias first lever surface 232 toward first lever interference surface 234. The interference (e.g., contact) between first lever surface 232 and first lever interference surface 234 blocks, or prevents, further rotation of plunger lever 174 in the first circumferential direction C2 about pin 188 (i.e., the inference overcomes the biasing load being applied by plunger torsion spring 192). In the engaged state, plunger lever 174 may be located radially inward of an upper surface 236 of head 120. In this regard, a distance between plunger lever 174 and axis A-A' may be less than a distance between upper surface 236 and axis A-A'. Upper surface 236 may be approximately perpendicular to first surface 124 and side surfaces 132 (FIG. 5B). As used in the previous context only, "approximately" means±15° from perpendicular. In accordance with various embodiments, the spring constant of compression spring 180 is selected (e.g., is great enough) to overcome the biasing load applied by plunger torsion spring 192.

Figure 7A:
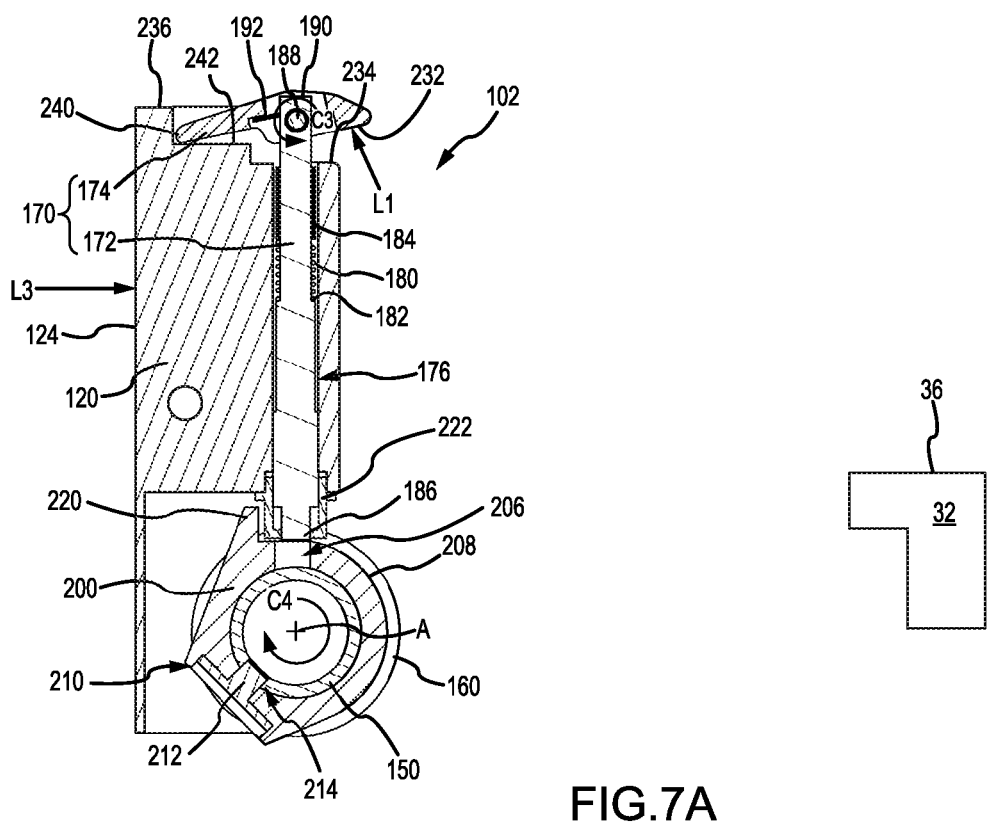
FIGS. 7A, 7B, 7C, 7D and 7E illustrate a cross-section view of the first restraint of the cargo restraint system of FIG. 2 taken along the line 6-6 in FIG. 5B as the first restraint rotates from the raised position to the stowed position, in accordance with various embodiments.

With reference to FIG. 7A, a cross-section view of first restraint 102, taken along line 6-6 in FIG. 5B, is illustrated, with first restraint 102 in the raised position and plunger 170 in a disengaged state. To translate plunger 170 from the engaged state (FIG. 6) to the disengaged state (FIG. 7A), a load L1 is applied to plunger lever 174, thereby causing plunger lever 174 to rotate in a second circumferential C3 about pin 188 (e.g., in a direction opposite the biasing force applied by plunger torsion spring 192). The load L1, along with an interference between an end 240 of plunger lever 174 and a second lever interference surface 242 of head 120, forces pin 188, second end 190 of plunger rod 172, and first lever surface 232 away from first lever interference surface 234 of head 120 and axis A-A'. The translation of plunger rod 172 away from axis A-A' causes first end 186 of plunger rod 172 to translate out of plunger opening 206. The translation of plunger rod 172 away from axis A-A' also compresses compression spring 180 between spring interference surface 182 and bushing 184.

Figure 7B:
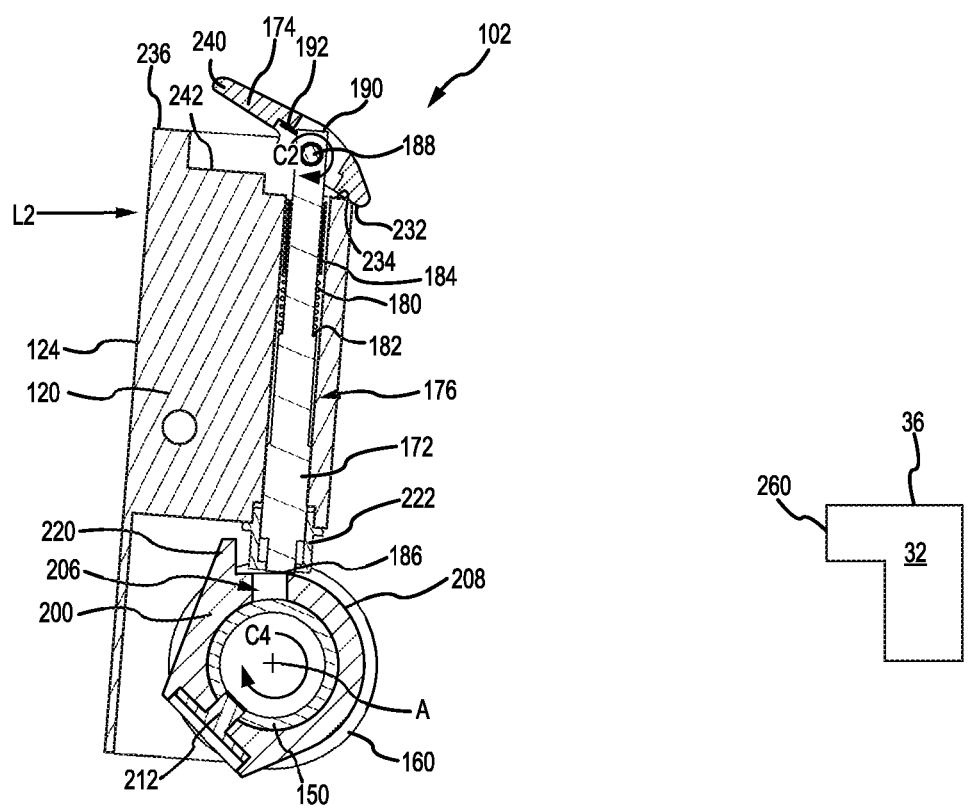

With reference to FIG. 7B, a cross-section view of first restraint 102, taken along line 6-6 in FIG. 5B, is illustrated, with plunger 170 in the disengaged state and first restraint 102 beginning to rotate toward the stowed position. In response to first end 186 of plunger rod 172 being located outside of plunger opening 206, head 120 can rotate about shroud 200. Stated differently, locating first end 186 of plunger rod 172 radially outward of outer circumferential surface 208 of shroud 200 removes the interference between shroud 200 and plunger rod 172, thereby allowing first end 186 of plunger rod 172 to translate circumferentially about axis A-A' and along the outer circumferential surface 208 of shroud 200. Shroud 200 does not rotate with head 120 due, at least in part, to the contact between key 212 and actuator shaft 150. With plunger 170 in the disengaged state, head 120 can be rotated in a second circumferential direction C4 about shroud 200, actuator shaft 150, and axis A-A' (e.g., toward the stowed position) in response to a load L2 greater than the biasing force of head torsion spring 160 being applied to head 120.

As head 120 is rotated in the second circumferential direction C4 (i.e., toward to stowed position), outer circumferential surface 208 of shroud 200 blocks first end 186 of plunger rod 172 from translating radially inward (i.e., toward axis A-A'), thereby maintaining the distance between pin 188 and first lever interference surface 234 of head 120 and between second end 190 of plunger rod 172 and first lever interference surface 234. The increased distance from first lever interference surface 234, along with the biasing force applied by plunger torsion spring 192, forces plunger lever 174 to rotate in the first circumferential direction C2 about pin 188. Plunger lever 174 may rotate about pin 188 until first lever surface 232 contacts head 120 (e.g., until plunger lever 174 contacts first lever interference surface 234). In the disengaged state, end 240 of plunger lever 174 may be located above upper surface 236 of head 120. Stated differently, a distance between end 240 of plunger lever 174 and axis A-A' may be greater than the distance between upper surface 236 of head 120 and axis A-A', when plunger 170 is in the disengaged state.

Figure 7C:
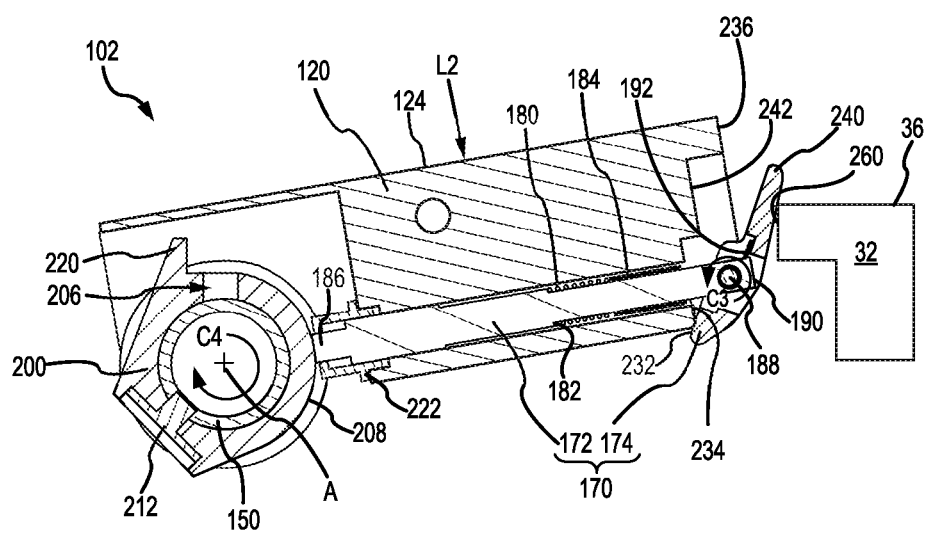
Figure 7D:
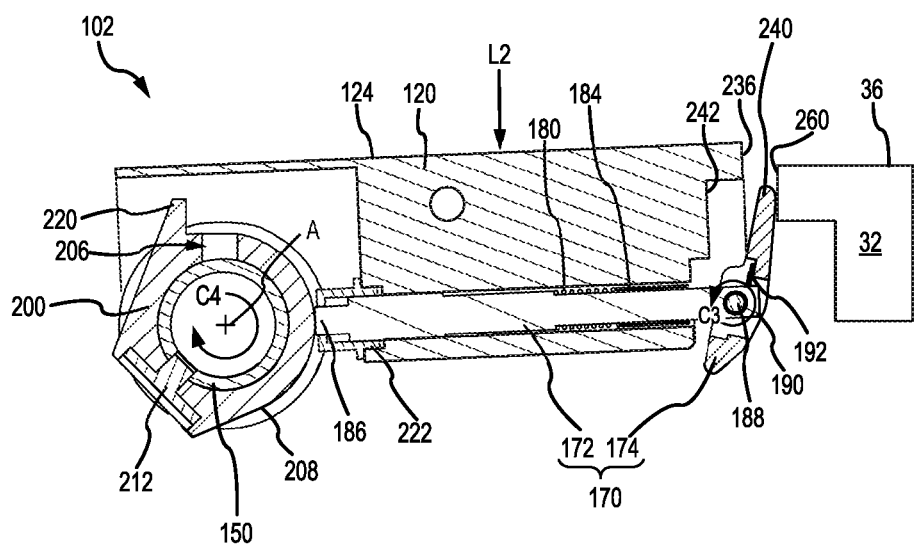

With reference to FIGS. 7C and 7D, as head 120 is rotated toward panel 32, contact is generated between a vertical surface 260 of panel 32 and plunger lever 174. Vertical surface 260 may be approximately perpendicular to upper surface 36 of panel 32. As used in the previous context only, "approximately" means±15° from perpendicular. The contact between vertical surface 260 and plunger lever 174 overcomes the biasing force applied by plunger torsion spring 192, thereby forcing plunger lever 174 to rotate about pin 188 in the second circumferential direction C3 (i.e., in a direction opposite the direction of the biasing load applied by plunger torsion spring 192). Stated differently, the contact between vertical surface 260 and plunger lever 174 translates end 240 of plunger lever 174 toward second lever interference surface 242, thereby decreasing the distance between end 240 of plunger lever 174 and axis A-A'.

Figure 7E:
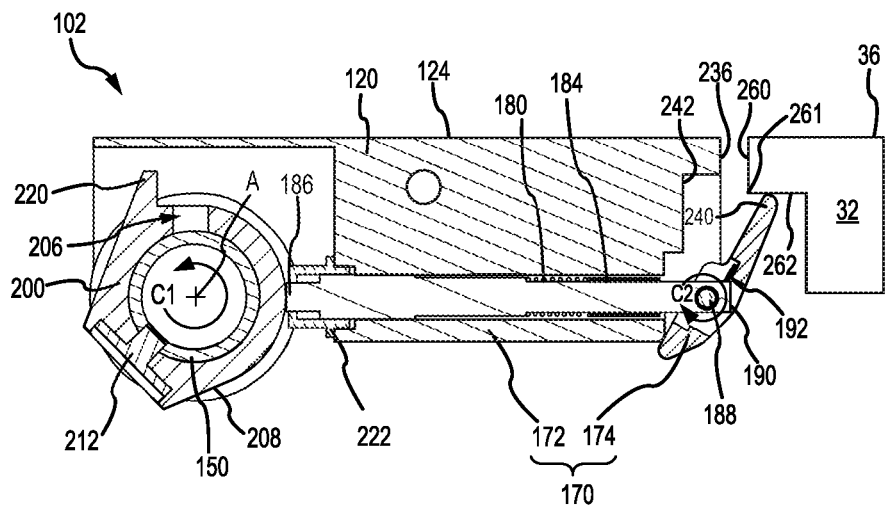

With reference to FIG. 7E, a cross-section view of first restraint 102, taken along line 6-6 in FIG. 5B, is illustrated, with plunger 170 in the disengaged state and first restraint 102 in the stowed position. In response to end 240 of plunger lever 174 translating past a bottom edge 261 of vertical surface 260, plunger torsion spring 192 forces plunger lever 174 to rotate in the first circumferential direction C2 about pin 188, thereby forcing end 240 of plunger lever 174 to translate past (e.g., above) upper surface 236 of head 120. Load L2 (FIG. 7D) may be removed from, and/or no longer applied to, head 120 in response to end 240 of plunger lever 174 translating past edge 261 of vertical surface 260. In response to the load L2 being removed from head 120, head torsion spring 160 may bias head 120 in the first circumferential direction C1 about axis A-A'. The biasing force of head torsion spring 160 forces end 240 of plunger lever 274 toward an underside surface 262 of panel 32. Underside surface 262 of panel is oriented away from upper surface 36 of panel. The contact between end 240 of plunger lever 174 and underside surface 262 of panel 32 maintains head 120 in the stowed position. Stated differently, the interference between plunger lever 174 and underside surface 262 prevents first restraint 102 from rotating to the raised position.

Figure 8A:
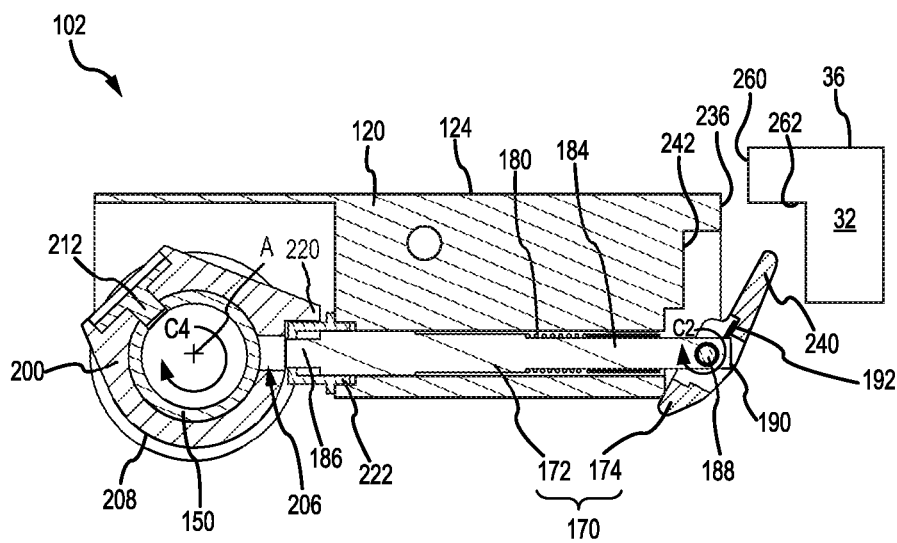
FIGS. 8A, 8B, and 8C illustrate a cross-section view of the first restraint of the cargo restraint system of FIG. 2 taken along the line 6-6 in FIG. 5B as the first restraint rotates from the stowed position to the raised position, in accordance with various embodiments.

With reference to FIG. 8A, a cross-section view of first restraint 102, taken along line 6-6 in FIG. 5B, is illustrated, with the plunger in the disengaged state and prior to first restraint 102 being rotated from the stowed state toward the raised state. In accordance with various embodiments, to rotate first restraint 102 from the stowed position to the raised position, plunger 170 is translated to the engaged position, thereby rotationally coupling head 120 to shroud 200 and actuator shaft 150. In this regard, actuator shaft 150 is rotated about axis A-A', thereby causing shroud 200 to rotate about axis A-A'. The rotation of shroud 200 brings protrusion 220 of shroud 200 into contact with drive cap 222. Protrusion 220 and drive cap 222 are configured such that plunger opening 206 is radially aligned with the first end 186 of plunger rod 172 when protrusion 220 contacts drive cap 222, however, the frictional force between underside surface 262 and plunger lever 174 prevents plunger rod 172 from translating into plunger opening 206. In this regard, the contact between protrusion 220 and drive cap 222 may force head 120 to rotate in the second circumferential direction C4 about axis A-A' (i.e., away from the raised position and in the direction opposite the direction of the biasing load applied by head torsion spring 160). The rotation of head 120 in the second circumferential direction C4 about axis A-A' forces end 240 of plunger lever 174 away from underside surface 262 of panel 32.

Figure 8B:
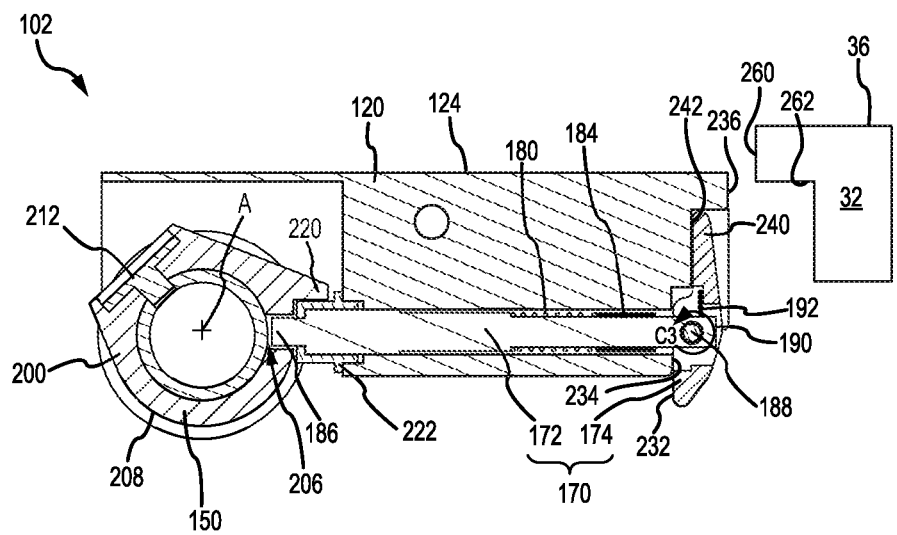
Figure 8C:
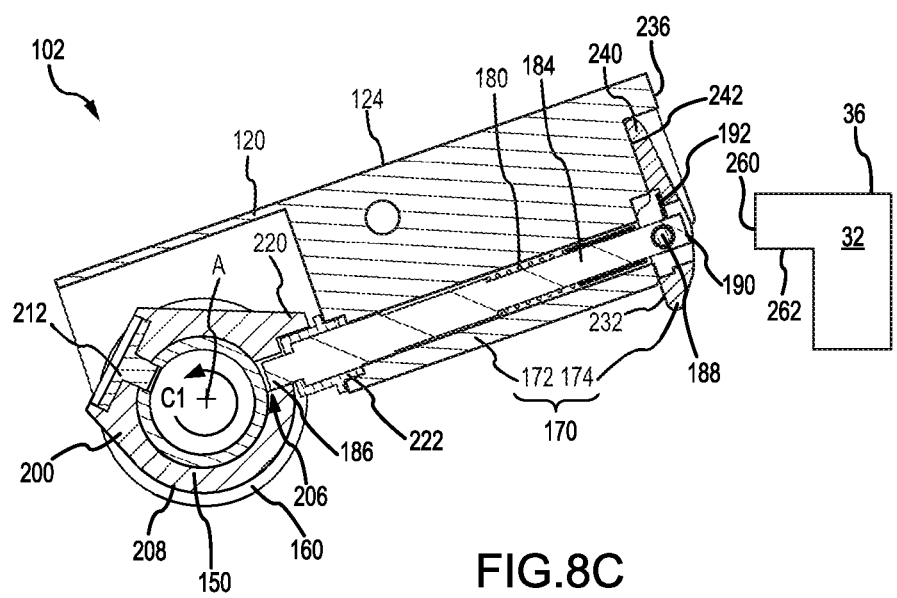

With reference to FIG. 8B, a cross-section view of first restraint 102, taken along line 6-6 in FIG. 5B, is illustrated, with plunger 170 in the engaged state and with first restraint 102 in position for the first restraint 102 to be rotated from the stowed position toward the raised position. In accordance with various embodiments, removing the frictional force between plunger lever 174 and underside surface 262 of panel 32, along with the biasing force applied by compression spring 180 and the alignment of first end 186 of plunger rod 172 with plunger opening 206, causes first end 186 of plunger rod 172 to translate radially inward, toward axis A-A' and into plunger opening 206. The radially inward translation of plunger rod 172 translates second end 190 of plunger rod 172 and pin 188 toward first lever interference surface 234, thereby forcing first lever surface 232 into contact with first lever interference surface 234. The contact between first lever interference surface 234 and first lever surface 232 forces end 240 of plunger lever 174 toward second lever interference surface 242, thereby locating end 240 of plunger lever 174 radially inward of upper surface 136 of head 120. With additional reference to FIG. 8C, with end 240 of plunger lever 174 radially inward of upper surface 136, head 120 may be rotated in the first circumferential direction C1 about axis A-A' and into the raised position.

While the FIGS. 4A-8C describe details of first restraint 102, it is further contemplated and understood that secondary restraints 104 and/or third restraints 106 in FIGS. 2 and 3 may include the features and functionalities described herein with reference to first restraint 102. For example, secondary restraints 104 and/or third restraints 106 may include a plunger, similar to plunger 170, and rotation of the secondary restraints 104 and/or third restraints 106 between a raised position and a stowed position may be controlled by actuation assembly 110 when the plungers are in an engaged state, and by rotating the restraints independently of one another when the plungers are in a disengaged state.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A restraint for use with a cargo loading system, the restraint comprising:
    a head defining a plunger channel;
    a plunger including a plunger rod and a plunger lever, the plunger rod being located, at least, partially in the plunger channel;

a plunger torsion spring configured to apply a first biasing load to the plunger lever; and a compression spring configured to bias a first end of the plunger away from an upper surface of the head.

2. The restraint of claim 1, further comprising a drive cap located around the first end of the plunger rod.

3. The restraint of claim 2, further comprising a shroud located proximate the first end of the plunger rod, the shroud defining a plunger opening configured to receive the first end of the plunger rod.

4. The restraint of claim 3, wherein the shroud includes a protrusion extending radially outward from an outer circumferential surface of the shroud.

5. The restraint of claim 4, wherein the protrusion is configured to contact the drive cap.

6. The restraint of claim 3, wherein the head includes a first lever interference surface configured to contact a first lever surface of the plunger lever when the first end of the plunger rod is located in the plunger opening of the shroud.

7. The restraint of claim 6, wherein an end of the plunger lever is configured to rotate above the upper surface of the head in response to the first end of the plunger rod being located radially outward of an outer circumferential surface of the shroud.

8. A cargo restraint system, comprising:
a first restraint configured to rotate about an axis;
a second restraint configured to rotate about the axis; and
an actuator assembly configured to simultaneously rotate the first restraint and the second restraint between a raised position and a stowed position,
wherein the first restraint includes:
a head configured to rotate about the axis; and
a plunger configured to translate between an engaged state and a disengaged state, wherein in the engaged state the head is rotationally coupled to the actuator assembly, and wherein in the disengaged state the head of the first restraint rotates independently of the second restraint and the actuator assembly.

9. The cargo restraint system of claim 8, wherein the plunger includes a plunger rod and a plunger lever, the plunger rod being configured to translate in a radial direction relative to the axis, the plunger lever being configured to rotate about a pin located through the plunger rod.

10. The cargo restraint system of claim 9, wherein the first restraint further includes:
a plunger torsion spring configured to apply a first biasing load to the plunger lever; and
a compression spring configured to bias a first end of the plunger rod toward the axis.

11. The cargo restraint system of claim 10, wherein the head of the first restraint includes a first lever interference surface configured to contact a first lever surface of the plunger when the plunger is in the engaged state.

12. The cargo restraint system of claim 8, wherein the actuator assembly comprises an actuator shaft configured to rotate about the axis, and wherein the first restraint and the second restraint are located about the actuator shaft.

13. The cargo restraint system of claim 12, wherein the first restraint further includes a shroud located radially between the actuator shaft and the head of the first restraint, the shroud defining a plunger opening configured to receive the plunger, and wherein in the engaged state the plunger is located in the plunger opening, and wherein in the disengaged state the plunger is located radially outward of an outer circumferential surface of the shroud.

14. The cargo restraint system of claim 13, wherein the first restraint further includes a drive cap coupled to the head, and wherein the shroud includes a protrusion extending radially outward from the outer circumferential surface of the shroud, the protrusion being configured to contact the drive cap.

15. The cargo restraint system of claim 13, further comprising a key located in a key opening defined by the shroud and in a key channel defined by the actuator shaft.

16. A cargo loading system, comprising:
a panel defining an orifice;
a restraint located in the orifice; and
an actuator shaft configured to rotate the restraint between a raised position and a stowed position;
wherein the restraint comprises:
a head configured to rotate about an axis; and
a plunger configured to translate between an engaged state and a disengaged state, wherein in the engaged state the head is rotationally coupled to the actuator shaft, and wherein in the disengaged state the head rotates independently of the actuator shaft.

17. The cargo loading system of claim 16, wherein the plunger comprises a plunger rod and a plunger lever, and wherein the restraint further comprises:
a plunger torsion spring configured to apply a biasing load to the plunger lever; and
a compression spring configured to bias a first end of the plunger rod away from an upper surface of the head.

18. The cargo loading system of claim 17, wherein in the disengaged state, the plunger lever is configured to contact an underside surface of the panel when the restraint is in the stowed position.

19. The cargo loading system of claim 16, wherein the restraint further includes a shroud located radially between the actuator shaft and the head of the restraint, the shroud defining a plunger opening configured to receive the plunger, and wherein in the engaged state the plunger is located in the plunger opening, and wherein in the disengaged state the plunger is located radially outward of an outer circumferential surface of the shroud.

20. The cargo loading system of claim 19, wherein the restraint further includes a drive cap coupled to the head, and wherein the shroud includes a protrusion extending radially outward from the outer circumferential surface of the shroud, the protrusion being configured to contact the drive cap.

* * * * *